United States Patent
Balderas et al.

(10) Patent No.: US 10,145,568 B2
(45) Date of Patent: Dec. 4, 2018

(54) HIGH EFFICIENCY HIGH POWER INNER FLAME BURNER

(71) Applicant: WHIRLPOOL CORPORATION, Benton Harbor, MI (US)

(72) Inventors: Jonathan Tovar Balderas, Guanajuato (MX); Francisco Javier Soria Contreras, Guanajuato (MX); Victor Ruelas Fajardo, Guanajuato (MX); Victor Gerardo Caloca Galindo, Guanajuato (MX); Ana Katia Silva Jiménez, Guanajuato (MX)

(73) Assignee: Whirlpool Corporation, Benton Harbor, MI (US)

( * ) Notice: Subject to any disclaimer, the term of this patent is extended or adjusted under 35 U.S.C. 154(b) by 200 days.

(21) Appl. No.: 15/193,735

(22) Filed: Jun. 27, 2016

(65) Prior Publication Data

US 2017/0370594 A1 Dec. 28, 2017

(51) Int. Cl.
| | | |
|---|---|---|
| *F24C 3/00* | (2006.01) | |
| *F24D 3/08* | (2006.01) | |
| *F23D 14/04* | (2006.01) | |
| *F23D 14/06* | (2006.01) | |
| *F24C 3/08* | (2006.01) | |

(Continued)

(52) U.S. Cl.
CPC ............ *F24D 3/082* (2013.01); *F23D 14/045* (2013.01); *F23D 14/06* (2013.01); *F23D 14/58* (2013.01); *F23D 14/64* (2013.01); *F24C 3/085* (2013.01); *F23D 2203/102* (2013.01); *F23D 2203/1015* (2013.01); *F23D 2203/1017* (2013.01)

(58) Field of Classification Search
CPC ........ F24C 3/082; F23D 15/045; F23D 15/06; F23D 2203/102
USPC .......................... 126/39 E, 39 R, 39 H, 39 K
See application file for complete search history.

(56) References Cited

U.S. PATENT DOCUMENTS

| | | | |
|---|---|---|---|
| 1,141,176 A | 6/1915 | Copeman | |
| 1,380,656 A | 6/1921 | Lauth | |

(Continued)

FOREIGN PATENT DOCUMENTS

| | | | |
|---|---|---|---|
| CA | 2365023 A1 | 7/2002 | |
| CA | 2734926 A1 | 10/2011 | |

(Continued)

OTHER PUBLICATIONS

Built-In Gas Cooktop, image post date Feb. 18, 2015, originally in U.S. Appl. No. 29/539,768 in Restriction Requirement dated Oct. 27, 2016, 10 pages, <http://www.bestbuy.com/site/kitchenaid-36-built-in-gas-cooktop-stainless-steel/8636634.p?skuld=8636634>.

(Continued)

*Primary Examiner* — Vivek Shirsat
(74) *Attorney, Agent, or Firm* — Price Heneveld LLP

(57) ABSTRACT

A gas burner for a cooking appliance includes a body defining perimeter and having a plurality of first groups of respective pluralities of first outlets a plurality of second groups of respective pluralities of second outlets. Each of the first outlets respectively defines a first outlet area, and each of the second outlets defines respective reduced outlet areas that are less than the first outlet area. Further, the first groups and second groups are alternately arranged around the perimeter, and a total number of first outlets is greater than a total number of second outlets.

17 Claims, 8 Drawing Sheets

(51) Int. Cl.
    *F23D 14/58* (2006.01)
    *F23D 14/64* (2006.01)

(56) References Cited

U.S. PATENT DOCUMENTS

| | | |
|---|---|---|
| 1,405,624 A | 2/1922 | Patterson |
| 1,598,996 A | 9/1926 | Wheelock |
| 1,808,550 A | 6/1931 | Harpman |
| 2,024,510 A | 12/1935 | Crisenberry |
| 2,530,991 A | 11/1950 | Reeves |
| 2,536,613 A | 1/1951 | Schulze et al. |
| 2,699,912 A | 1/1955 | Cushman |
| 2,777,407 A | 1/1957 | Schindler |
| 2,781,038 A | 2/1957 | Sherman |
| 2,791,366 A | 5/1957 | Geisler |
| 2,815,018 A | 12/1957 | Collins |
| 2,828,608 A | 4/1958 | Cowlin et al. |
| 2,847,932 A | 8/1958 | More |
| 2,930,194 A | 5/1960 | Perkins |
| 2,934,957 A | 5/1960 | Reinhart et al. |
| D191,085 S | 8/1961 | Kindl et al. |
| 3,017,924 A | 1/1962 | Jenson |
| 3,051,813 A | 8/1962 | Busch et al. |
| 3,065,342 A | 11/1962 | Worden |
| 3,089,407 A | 5/1963 | Kinkle |
| 3,259,120 A | 7/1966 | Keating |
| 3,386,431 A | 6/1968 | Branson |
| 3,463,138 A | 8/1969 | Lotter et al. |
| 3,548,154 A | 12/1970 | Christiansson |
| 3,602,131 A | 8/1971 | Dadson |
| 3,645,249 A | 2/1972 | Henderson et al. |
| 3,691,937 A | 9/1972 | Meek et al. |
| 3,777,985 A | 12/1973 | Hughes et al. |
| 3,780,954 A | 12/1973 | Genbauffs |
| 3,857,254 A | 12/1974 | Lobel |
| 3,877,865 A | 4/1975 | Duperow |
| 3,899,655 A | 8/1975 | Skinner |
| D245,663 S | 9/1977 | Gordon |
| 4,104,952 A | 8/1978 | Brass |
| 4,149,518 A | 4/1979 | Schmidt et al. |
| 4,363,956 A | 12/1982 | Scheidler et al. |
| 4,413,610 A | 11/1983 | Berlik |
| 4,418,456 A | 12/1983 | Riehl |
| 4,447,711 A | 5/1984 | Fischer |
| 4,466,789 A | 8/1984 | Riehl |
| 4,518,346 A | 5/1985 | Pistien |
| 4,587,946 A | 5/1986 | Doyon et al. |
| 4,646,963 A | 3/1987 | Delotto et al. |
| 4,654,508 A | 3/1987 | Logel et al. |
| 4,689,961 A | 9/1987 | Stratton |
| 4,812,624 A | 3/1989 | Kern |
| 4,818,824 A | 4/1989 | Dixit et al. |
| 4,846,671 A | 7/1989 | Kwiatek |
| 4,886,043 A | 12/1989 | Homer |
| 4,891,936 A | 1/1990 | Shekleton et al. |
| D309,398 S | 7/1990 | Lund |
| 4,981,416 A | 1/1991 | Nevin et al. |
| 4,989,404 A | 2/1991 | Shekleton |
| 5,021,762 A | 6/1991 | Hetrick |
| 5,136,277 A | 8/1992 | Civanelli et al. |
| 5,171,951 A | 12/1992 | Chartrain et al. |
| D332,385 S | 1/1993 | Adams |
| 5,215,074 A | 6/1993 | Wilson et al. |
| 5,243,172 A | 9/1993 | Hazan et al. |
| D340,383 S | 10/1993 | Addison et al. |
| 5,272,317 A | 12/1993 | Ryu |
| D342,865 S | 1/1994 | Addison et al. |
| 5,316,423 A | 5/1994 | Kin |
| 5,397,234 A | 3/1995 | Kwiatek |
| 5,448,036 A | 9/1995 | Husslein et al. |
| D364,993 S | 12/1995 | Andrea |
| 5,491,423 A | 2/1996 | Turetta |
| D369,517 S | 5/1996 | Ferlin |
| 5,571,434 A | 11/1996 | Cavener et al. |
| D378,578 S | 3/1997 | Eberhardt |
| 5,618,458 A | 4/1997 | Thomas |
| 5,649,822 A | 7/1997 | Gertler et al. |
| 5,785,047 A | 7/1998 | Bird et al. |
| 5,842,849 A | 12/1998 | Huang |
| 5,913,675 A | 6/1999 | Vago et al. |
| D414,377 S | 9/1999 | Huang |
| 5,967,021 A | 10/1999 | Yung |
| 6,016,096 A | 1/2000 | Barnes et al. |
| 6,030,207 A | 2/2000 | Saleri |
| 6,049,267 A | 4/2000 | Barnes et al. |
| 6,050,176 A | 4/2000 | Schultheis et al. |
| 6,078,243 A | 6/2000 | Barnes et al. |
| 6,089,219 A | 7/2000 | Kodera et al. |
| 6,092,518 A | 7/2000 | Dane |
| 6,111,229 A | 8/2000 | Schultheis |
| 6,114,665 A | 9/2000 | Garcia et al. |
| 6,133,816 A | 10/2000 | Barnes et al. |
| 6,155,820 A | 12/2000 | Döbbeling |
| 6,188,045 B1 | 2/2001 | Hansen et al. |
| 6,192,669 B1 | 2/2001 | Keller et al. |
| 6,196,113 B1 | 3/2001 | Yung |
| 6,253,759 B1 | 7/2001 | Giebel et al. |
| 6,253,761 B1 | 7/2001 | Shuler et al. |
| 6,320,169 B1 | 11/2001 | Clothier |
| 6,322,354 B1 | 11/2001 | Carbone et al. |
| 66,362,458 | 3/2002 | Sargunam et al. |
| 6,452,136 B1 | 9/2002 | Berkcan et al. |
| 6,452,141 B1 | 9/2002 | Shon |
| 6,589,046 B2 | 7/2003 | Harneit |
| 6,614,006 B2 | 9/2003 | Pastore et al. |
| 6,619,280 B1 | 9/2003 | Zhou et al. |
| 6,655,954 B2 | 12/2003 | Dane |
| 6,663,009 B1 | 12/2003 | Bedetti et al. |
| 6,718,965 B2 | 4/2004 | Rummel et al. |
| 6,733,146 B1 | 5/2004 | Vastano |
| 6,806,444 B2 | 10/2004 | Lerner |
| 6,837,151 B2 | 1/2005 | Chen |
| 6,891,133 B2 | 5/2005 | Shozo et al. |
| 6,910,342 B2 | 6/2005 | Berns et al. |
| 6,930,287 B2 | 8/2005 | Gerola et al. |
| 6,953,915 B2 | 10/2005 | Garris, III |
| 7,017,572 B2 | 3/2006 | Cadima |
| D524,105 S | 7/2006 | Poltronieri |
| 7,083,123 B2 | 8/2006 | Molla |
| 7,220,945 B1 | 5/2007 | Wang |
| D544,753 S | 6/2007 | Tseng |
| 7,274,008 B2 | 9/2007 | Arnal Valero et al. |
| 7,281,715 B2 | 10/2007 | Boswell |
| 7,291,009 B2 | 11/2007 | Kamal et al. |
| 7,315,247 B2 | 1/2008 | Jung et al. |
| 7,325,480 B2 | 2/2008 | Grühbaum et al. |
| D564,296 S | 3/2008 | Koch et al. |
| 7,348,520 B2 | 3/2008 | Wang |
| 7,368,685 B2 | 5/2008 | Nam et al. |
| 7,411,160 B2 | 8/2008 | Duncan et al. |
| 7,414,203 B2 | 8/2008 | Winkler |
| 7,417,204 B2 | 8/2008 | Nam et al. |
| D581,736 S | 12/2008 | Besseas |
| 7,468,496 B2 | 12/2008 | Marchand |
| D592,445 S | 5/2009 | Sorenson et al. |
| 7,527,495 B2 | 5/2009 | Yam et al. |
| D598,959 S | 8/2009 | Kiddoo |
| 7,589,299 B2 | 9/2009 | Fisher et al. |
| D604,098 S | 11/2009 | Hamlin |
| 7,614,877 B2 | 11/2009 | McCrorey et al. |
| 7,628,609 B2 | 12/2009 | Pryor et al. |
| 7,640,930 B2 | 1/2010 | Little et al. |
| 7,696,454 B2 | 4/2010 | Nam et al. |
| 7,708,008 B2 | 5/2010 | Elkasevic et al. |
| 7,721,727 B2 | 5/2010 | Kobayashi |
| 7,731,493 B2 | 6/2010 | Starnini et al. |
| 7,762,250 B2 | 7/2010 | Elkasevic et al. |
| 7,781,702 B2 | 8/2010 | Nam et al. |
| 7,823,502 B2 | 11/2010 | Hecker et al. |
| 7,829,825 B2 | 11/2010 | Kühne |
| 7,841,333 B2 | 11/2010 | Kobayashi |
| 7,964,823 B2 | 6/2011 | Armstrong et al. |
| D642,675 S | 8/2011 | Scribano et al. |
| 8,006,687 B2 | 8/2011 | Watkins et al. |

(56) References Cited

U.S. PATENT DOCUMENTS

| | | |
|---|---|---|
| 8,015,821 B2 | 9/2011 | Spytek |
| 8,037,689 B2 | 10/2011 | Oskin et al. |
| 8,057,223 B2 | 11/2011 | Pryor et al. |
| 8,141,549 B2 | 3/2012 | Armstrong et al. |
| 8,217,314 B2 | 7/2012 | Kim et al. |
| 8,220,450 B2 | 7/2012 | Luo et al. |
| 8,222,578 B2 | 7/2012 | Beier |
| D665,491 S | 8/2012 | Goel et al. |
| 8,272,321 B1 | 9/2012 | Kalsi et al. |
| 8,288,690 B2 | 10/2012 | Boubeddi et al. |
| 8,302,593 B2 | 11/2012 | Cadima |
| 8,304,695 B2 | 11/2012 | Bonuso et al. |
| 8,342,165 B2 | 1/2013 | Watkins |
| 8,344,292 B2 | 1/2013 | Franca et al. |
| 8,393,317 B2 | 3/2013 | Sorenson et al. |
| 8,398,303 B2 | 3/2013 | Kuhn |
| 8,430,310 B1 | 4/2013 | Ho et al. |
| 8,464,703 B2 | 6/2013 | Ryu et al. |
| D685,225 S | 7/2013 | Santoyo et al. |
| D687,675 S | 8/2013 | Filho et al. |
| 8,526,935 B2 | 9/2013 | Besore et al. |
| 8,535,052 B2 | 9/2013 | Cadima |
| D693,175 S | 11/2013 | Saubert |
| 8,584,663 B2 | 11/2013 | Kim et al. |
| 8,596,259 B2 | 12/2013 | Padgett et al. |
| 8,616,193 B2 | 12/2013 | Padgett |
| 8,660,297 B2 | 2/2014 | Yoon et al. |
| 8,687,842 B2 | 4/2014 | Yoon et al. |
| 8,689,782 B2 | 4/2014 | Padgett |
| 8,707,945 B2 | 4/2014 | Hasslberger et al. |
| 8,747,108 B2 | 6/2014 | Lona Santoyo et al. |
| 8,800,543 B2 | 8/2014 | Simms et al. |
| D718,061 S | 11/2014 | Wu |
| 8,887,710 B2 | 11/2014 | Rossi et al. |
| 8,930,160 B2 | 1/2015 | Wall et al. |
| 8,932,049 B2 | 1/2015 | Ryu et al. |
| 8,950,389 B2 | 2/2015 | Horstkoetter et al. |
| 8,978,637 B2 | 3/2015 | Ryu et al. |
| D727,489 S | 4/2015 | Rohskopf et al. |
| 9,021,942 B2 | 5/2015 | Lee et al. |
| 9,074,765 B2 | 7/2015 | Armanni |
| D735,525 S | 8/2015 | Nguyen |
| 9,113,503 B2 | 8/2015 | Arnal Valero et al. |
| 9,132,302 B2 | 9/2015 | Luongo et al. |
| D743,203 S | 11/2015 | Filho et al. |
| 9,175,858 B2 | 11/2015 | Tisselli et al. |
| D750,314 S | 2/2016 | Hobson et al. |
| 9,307,888 B2 | 4/2016 | Baldwin et al. |
| D758,107 S | 6/2016 | Hamilton |
| D766,036 S | 9/2016 | Koch et al. |
| D766,696 S | 9/2016 | Kemker |
| 9,513,015 B2 | 12/2016 | Estrella et al. |
| 9,521,708 B2 | 12/2016 | Adelmann et al. |
| 9,557,063 B2 | 1/2017 | Cadima |
| 9,572,475 B2 | 2/2017 | Gephart et al. |
| 9,644,847 B2 | 5/2017 | Bhogal et al. |
| 9,696,042 B2 | 7/2017 | Hasslberger et al. |
| 9,927,129 B2 | 3/2018 | Bhogal et al. |
| 2002/0065039 A1 | 5/2002 | Benezech et al. |
| 2004/0007566 A1 | 1/2004 | Staebler et al. |
| 2004/0031782 A1 | 2/2004 | Westfield |
| 2004/0195399 A1 | 10/2004 | Molla |
| 2004/0224273 A1 | 11/2004 | Inomata |
| 2004/0224274 A1 | 11/2004 | Tomiura |
| 2005/0029245 A1 | 2/2005 | Gerola et al. |
| 2005/0112520 A1 | 5/2005 | Todoli et al. |
| 2005/0194001 A1* | 9/2005 | Armanni ............... F24C 3/085 126/39 E |
| 2005/0199232 A1 | 9/2005 | Gama et al. |
| 2005/0268794 A1 | 12/2005 | Nesterov |
| 2007/0124972 A1 | 6/2007 | Ratcliffe |
| 2007/0181410 A1 | 8/2007 | Baier |
| 2007/0281267 A1 | 12/2007 | Li |
| 2008/0029081 A1 | 2/2008 | Gagas |
| 2008/0050687 A1 | 2/2008 | Wu |
| 2008/0173632 A1 | 7/2008 | Jang et al. |
| 2008/0210685 A1 | 9/2008 | Beier |
| 2009/0173730 A1 | 7/2009 | Baier et al. |
| 2009/0320823 A1 | 12/2009 | Padgett |
| 2010/0035197 A1 | 2/2010 | Cadima |
| 2010/0114339 A1 | 5/2010 | Kaiser et al. |
| 2010/0126496 A1 | 5/2010 | Luo et al. |
| 2010/0192939 A1 | 8/2010 | Parks |
| 2011/0142998 A1 | 6/2011 | Johncock et al. |
| 2011/0163086 A1 | 7/2011 | Aldana Arjol et al. |
| 2011/0248021 A1 | 10/2011 | Gutierrez et al. |
| 2012/0017595 A1 | 1/2012 | Liu |
| 2012/0024835 A1 | 2/2012 | Artal Lahoz et al. |
| 2012/0036855 A1 | 2/2012 | Hull |
| 2012/0067334 A1 | 3/2012 | Kim et al. |
| 2012/0076351 A1 | 3/2012 | Yoon et al. |
| 2012/0099761 A1 | 4/2012 | Yoon et al. |
| 2012/0160228 A1 | 6/2012 | Kim et al. |
| 2012/0171343 A1 | 7/2012 | Cadima et al. |
| 2012/0261405 A1 | 10/2012 | Kurose et al. |
| 2013/0043239 A1 | 2/2013 | Anton Falcon et al. |
| 2013/0252188 A1 | 9/2013 | Chen |
| 2013/0255663 A1 | 10/2013 | Cadima et al. |
| 2013/0260618 A1 | 10/2013 | Bally et al. |
| 2014/0048055 A1 | 2/2014 | Ruther |
| 2014/0071019 A1 | 3/2014 | Lim |
| 2014/0090636 A1 | 4/2014 | Bettinzoli |
| 2014/0097172 A1 | 4/2014 | Kang et al. |
| 2014/0116416 A1 | 5/2014 | Saubert |
| 2014/0137751 A1 | 5/2014 | Bellm |
| 2014/0139381 A1 | 5/2014 | Sippel |
| 2014/0318527 A1 | 10/2014 | Silva et al. |
| 2014/0352549 A1 | 12/2014 | Upston et al. |
| 2015/0040887 A1* | 2/2015 | Angulo ............... F24C 3/08 126/39 E |
| 2015/0136760 A1 | 5/2015 | Lima et al. |
| 2015/0153041 A1 | 6/2015 | Neumeier |
| 2015/0241069 A1 | 8/2015 | Brant et al. |
| 2015/0330640 A1 | 11/2015 | Wersborg |
| 2015/0345800 A1* | 12/2015 | Cabrera Botello ..... F23D 14/06 126/39 E |
| 2015/0359045 A1 | 12/2015 | Neukamm et al. |
| 2016/0029439 A1 | 1/2016 | Kurose et al. |
| 2016/0061490 A1 | 3/2016 | Cho et al. |
| 2016/0091210 A1 | 3/2016 | Ceccoli |
| 2016/0116160 A1 | 4/2016 | Takeuchi |
| 2016/0153666 A1 | 6/2016 | Tcaciuc |
| 2016/0174768 A1 | 6/2016 | Deverse |
| 2016/0178209 A1 | 6/2016 | Park et al. |
| 2016/0178212 A1 | 6/2016 | Park et al. |
| 2016/0187002 A1 | 6/2016 | Ryu et al. |
| 2016/0201902 A1 | 7/2016 | Cadima |
| 2016/0209044 A1 | 7/2016 | Cadima |
| 2016/0209045 A1 | 7/2016 | Millius |
| 2016/0295644 A1 | 10/2016 | Khokle et al. |
| 2016/0296067 A1 | 10/2016 | Laws |
| 2017/0003033 A1 | 1/2017 | Lona Santoyo et al. |
| 2017/0067651 A1 | 3/2017 | Khokle et al. |
| 2017/0074522 A1 | 3/2017 | Cheng |
| 2017/0082296 A1 | 3/2017 | Jeong et al. |
| 2017/0082299 A1 | 3/2017 | Rowley et al. |
| 2017/0108228 A1 | 4/2017 | Park et al. |
| 2017/0115008 A1 | 4/2017 | Erbe et al. |
| 2017/0261213 A1 | 4/2017 | Park et al. |
| 2017/0223774 A1 | 8/2017 | Cheng |
| 2018/0058702 A1 | 3/2018 | Jang et al. |

FOREIGN PATENT DOCUMENTS

| | | |
|---|---|---|
| CN | 201680430 U | 12/2010 |
| DE | 2845869 A1 | 4/1980 |
| DE | 3014908 A1 | 10/1981 |
| DE | 3446621 A1 | 6/1986 |
| DE | 3717728 A1 | 12/1988 |
| DE | 3150450 C2 | 8/1989 |
| DE | 3839657 A1 | 5/1990 |
| DE | 4103664 C1 | 1/1992 |
| DE | 4445594 C1 | 6/1996 |
| DE | 10218294 A1 | 11/2003 |

(56) References Cited

FOREIGN PATENT DOCUMENTS

| | | |
|---|---|---|
| DE | 30004581 T2 | 6/2004 |
| DE | 19912452 B4 | 10/2007 |
| DE | 102006034391 A1 | 1/2008 |
| DE | 102007021297 A1 | 11/2008 |
| DE | 102008027220 A1 | 12/2009 |
| DE | 102009002276 A1 | 10/2010 |
| DE | 102013218714 A1 | 4/2014 |
| EP | 0122966 A2 | 10/1984 |
| EP | 0429120 A2 | 5/1991 |
| EP | 0620698 A1 | 10/1994 |
| EP | 0690659 A2 | 1/1996 |
| EP | 1030114 A1 | 8/2000 |
| EP | 1217306 A2 | 6/2002 |
| EP | 1344986 A1 | 9/2003 |
| EP | 1586822 A1 | 10/2005 |
| EP | 1099905 B1 | 2/2006 |
| EP | 2063181 A2 | 5/2009 |
| EP | 2063444 A1 | 5/2009 |
| EP | 2116775 A1 | 11/2009 |
| EP | 2116829 A1 | 11/2009 |
| EP | 2278227 A2 | 1/2011 |
| EP | 2299181 A1 | 3/2011 |
| EP | 2375170 A1 | 10/2011 |
| EP | 2144012 B1 | 9/2012 |
| EP | 2657615 A1 | 10/2013 |
| EP | 2816291 A1 | 12/2014 |
| EP | 2835580 A2 | 2/2015 |
| EP | 3006832 A1 | 4/2016 |
| EP | 2848867 B1 | 9/2017 |
| FR | 2787556 A1 | 6/2000 |
| FR | 2789753 A1 | 8/2000 |
| FR | 3003338 A1 | 9/2014 |
| JP | 2001141244 A | 5/2001 |
| JP | 2005009693 A | 1/2005 |
| JP | 2007147131 A | 6/2007 |
| JP | 2010038475 A | 2/2010 |
| JP | 2011257021 A | 12/2011 |
| WO | 1991013526 A1 | 9/1991 |
| WO | 9850736 A1 | 11/1998 |
| WO | 2006072388 A1 | 7/2006 |
| WO | 2006136363 A1 | 12/2006 |
| WO | 2012077050 A2 | 6/2012 |
| WO | 2013098330 A2 | 7/2013 |
| WO | 2013182410 A1 | 12/2013 |
| WO | 2014194176 A1 | 12/2014 |
| WO | 2015086420 A1 | 6/2015 |

OTHER PUBLICATIONS

True-Heat burner, image post date Jan. 30, 2015, originally in U.S. Appl. No. 29/539,768 in Restriction Requirement dated Oct. 27, 2016, 2 pages, <http://ovens.reviewed.com/news/kitchenaid-has-a-new-flame>.

Metal Cover Gas Hob, image post date 2012, originally in U.S. Appl. No. 29/539,768 in Restriction Requirement dated Oct. 27, 2016, 13 pages, <http://inse.gmc.globalmarket.com/products/details/metal-cover-gas-hob-8516959.html>.

Penny Stove, image post date 2004, originally in U.S. Appl. No. 29/539,768 in Restriction Requirement dated Oct. 27, 2016, 30 pages, <http://www.jureystudio.com/pennystove/stoveinstruction.html>.

European Patent Office, European Search Report for EP Application No. 17177980.4, dated Nov. 7, 2017, 7 pages.

\* cited by examiner

US 10,145,568 B2

HIGH EFFICIENCY HIGH POWER INNER FLAME BURNER

BACKGROUND

The present disclosure generally relates to a burner for a gas-powered cooking appliance. In one aspect, the disclosure relates to an inner-flame burner.

Various solutions have been developed to provide improved heat distribution in gas burner arrangements. In one example, burners have been developed with two or three concentric burner rings to distribute heat outwardly in various levels. Further, so-called inner flame burners have been developed to direct heat inward relative to the burner and toward the center of a corresponding cooking implement. However, such burners may include complex components and may lack power due to limitations of the fuel-air mix, both primary and secondary, that they employ. Further, such burners have provided uneven flames.

SUMMARY

In at least one aspect of the present disclosure, a gas burner for a cooking appliance includes a body defining perimeter and having a plurality of first groups of respective pluralities of first outlets a plurality of second groups of respective pluralities of second outlets. Each of the first outlets respectively defines a first outlet area, and each of the second outlets defines respective reduced outlet areas that are less than the first outlet area. Further, the first groups and second groups are alternately arranged around the perimeter, and a total number of first outlets are greater than a total number of second outlets.

In at least another aspect, a gas burner assembly for a cooking appliance includes a body defining a plurality of outlets around a perimeter thereof, an air-fuel mix inlet, a distribution chamber in fluid communication between the air-fuel mix inlet and the plurality of outlets, and a venturi in communication with the air-fuel mix inlet at a first end thereof. The first end of the venturi has a first diameter, and the venturi extends to a second end opposite the first end and having a second diameter greater than the first diameter. The assembly further includes a holder unit defining an air inlet and a fuel inlet. Both the air inlet and the fuel inlet are in fluid communication with the venturi at the second end thereof.

In at least another aspect, a cooking hob includes a cooktop body having an upper surface and a lower surface and defining a first burner area along the upper surface and a burner having a body positioned within the first burner area and defining a lower surface, an upper surface, and a plurality of ports extending between the upper and lower surfaces. The lower surface of the burner is spaced above the upper surface of the cooktop body to define an air flow path from an outer periphery of the burner, along the lower surface thereof, and through the plurality of ports.

These and other features, advantages, and objects of the present device will be further understood and appreciated by those skilled in the art upon studying the following specification, claims, and appended drawings.

DETAILED DESCRIPTION OF EMBODIMENTS

Figure 1:
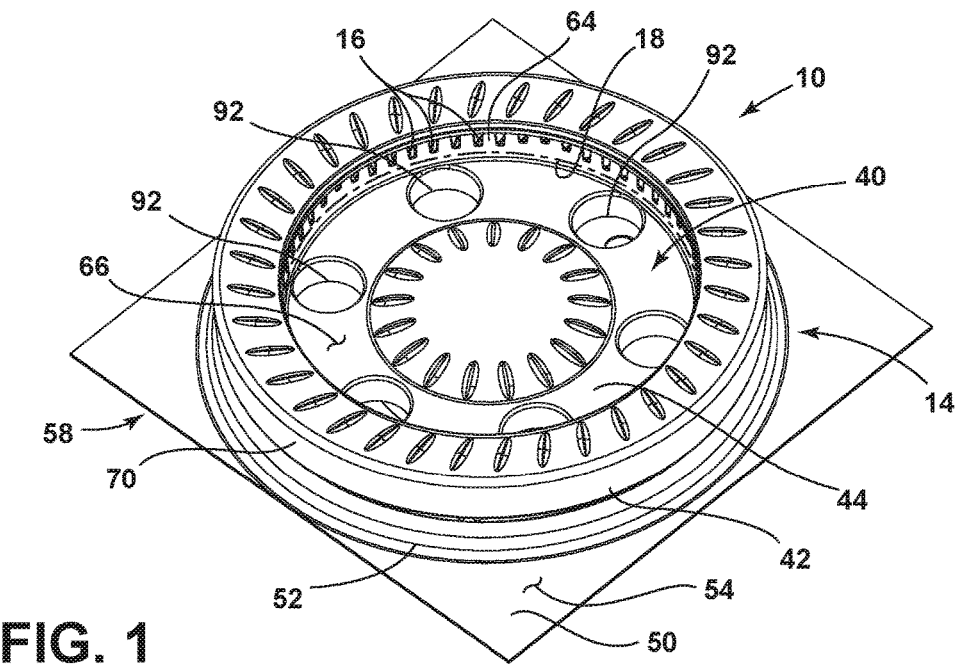
FIG. 1 is a top perspective view of a burner assembly.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
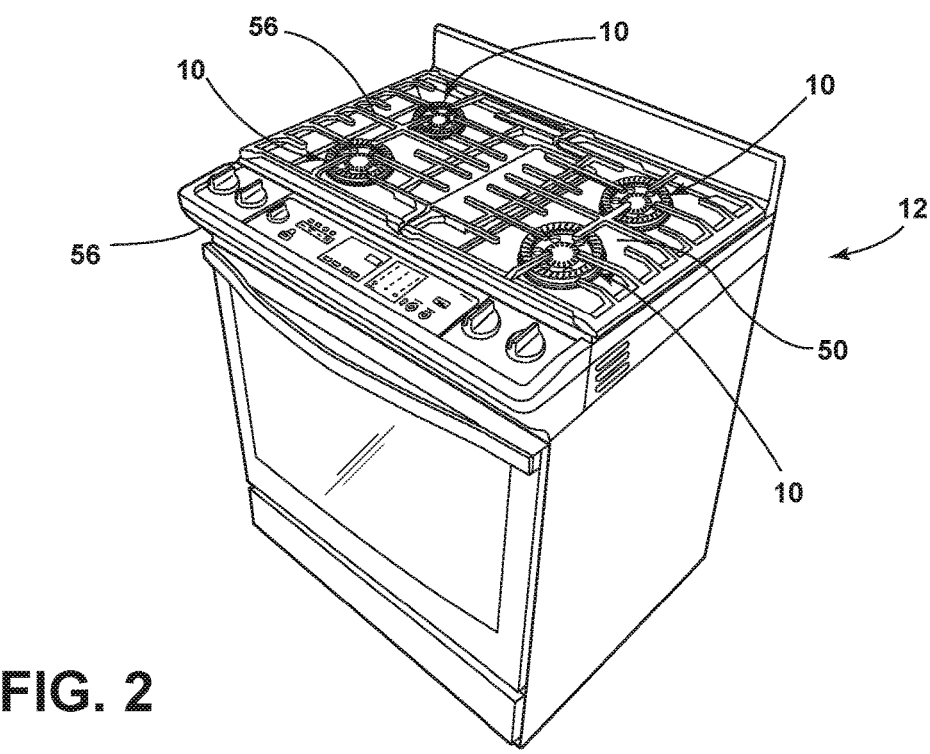
FIG. 2 is a cooking appliance incorporating a plurality of burner assemblies according to FIG. 1.

Referring to the embodiment illustrated in FIG. 1, reference numeral 10 generally designates a burner assembly for a cooking appliance 12, such as a range, as illustrated in FIG. 2, a stand-alone cooktop, or any other such appliance including what may generally be referred to as a cooking hob, or the like. Burner 10 includes a body 14 defining a plurality of ports 16 around a perimeter 18 thereof, which as illustrated, may be an inner perimeter. As further shown in FIGS. 1 and 8, body 14 further defines an air-fuel mix inlet 20 and a distribution chamber 22 in fluid communication between air fuel mix inlet 20 and the plurality of ports 16. Body 14 further includes a venturi 24 in communication with the air fuel mix inlet 20 at first end 26 thereof, the first end 26 of the venturi 24 having a first diameter 28. The venturi 24 further extends to a second end 30 opposite the first end 26 and having a second diameter 32 greater than the first diameter 28. The burner assembly 10 further includes a holder unit 34 defining an air inlet 36 and a fuel inlet 38 that are generally in fluid communication with the venturi 24 at the second end 30 thereof.

Figure 7:
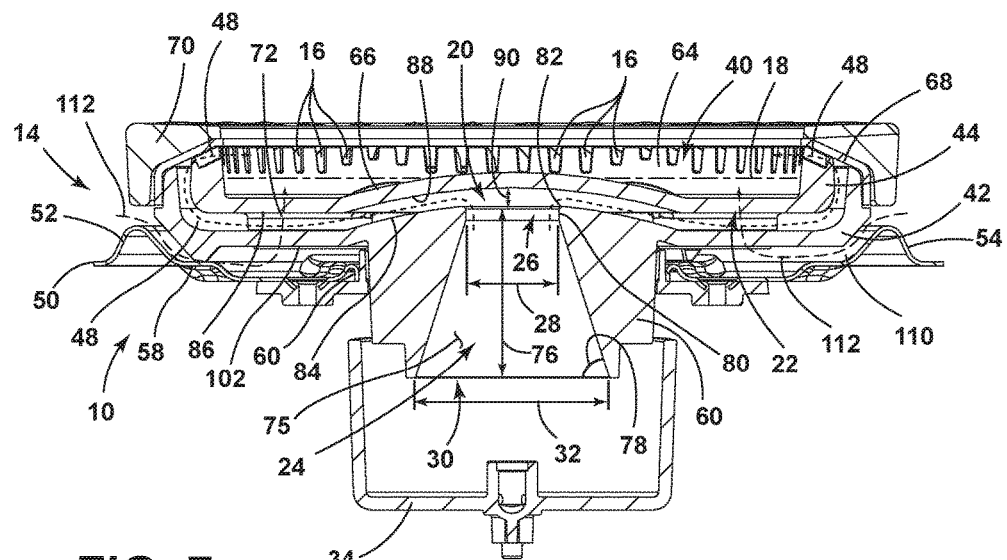
FIG. 7 is a cross-section view of the burner assembly of FIG. 1 taken along the line VII-VII in FIG. 4.
Figure 8:
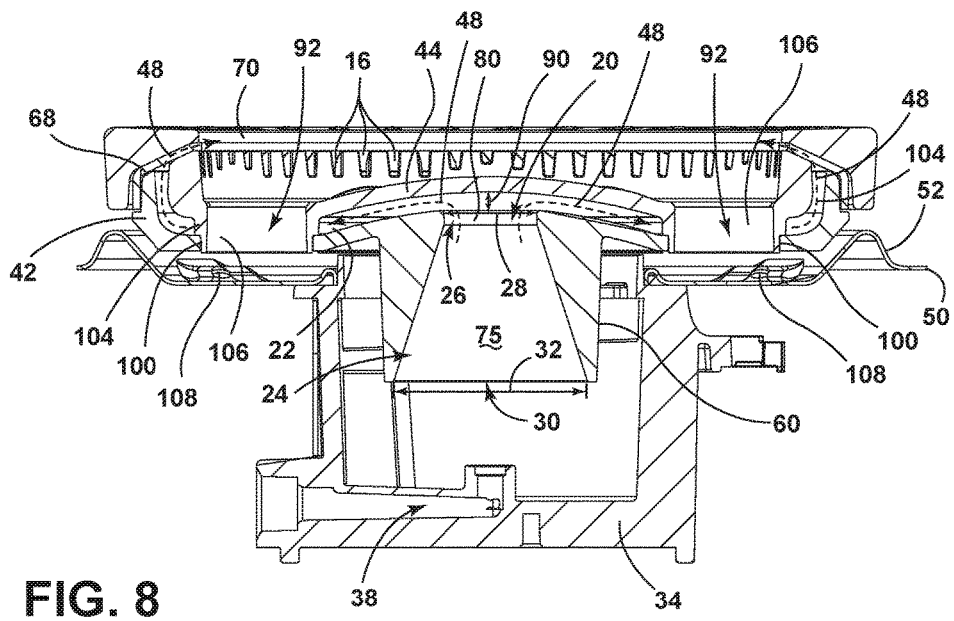
FIG. 8 is a cross-section view of the burner assembly of FIG. 1 taken along the line IIX-IIX in FIG. 4.

As further shown in FIG. 1, the gas burner assembly 10 described herein is what is generally referred to as an inner-flame gas burner. In such a burner configuration, the above-described plurality of ports 16 are disposed along perimeter 18 that is defined along a feature interior to body 14, such as cavity 40 shown in FIG. 1. Accordingly, ports 16 are directed inwardly toward cavity 40 and face respectively opposite ones of said ports 16. In this type of burner, the configuration of ports 16 is achieved by including within body 14 a base 42 and a spreader 44. The above-mentioned air-fueled mix inlet 20 is defined by base 42, and the ports 16 are disposed along spreader 44 along inwardly-disposed perimeter 18. The distribution chamber 22 communicatively disposed between air fuel mix inlet 20 and ports 16 is defined, as shown in FIG. 7, between a lower end defined by base 42 and an upper end defined by spreader 44. In this manner, base 42 defines an outer diameter 46 of body 14 and is further configured to receive spreader 44 within a portion thereof, the spreader 44 generally defining the recessed cavity 40 that is inset relative to outer diameter 46 of body 14. In this manner, and as depicted in FIGS. 7 and 8, a portion of the air fuel mix distribution chamber 22 is defined on lower and outer portions thereof by respective portions of base 42 and on upper and interior portions thereof by respective portions of spreader 44. In this manner, a fuel air mix path 48 is defined between air-fuel mix inlet 20 and ports 16 through distribution chamber 22, as directed by respective portions of spreader 44 and base 42.

The inner-flame burner assembly 10, as described herein, can provide increased thermal efficiency and, potentially, improved heat distribution from a center to corresponding edges of a pot, pan, or other cooking implement position above burner 10 during use thereof by directing the thermal energy provided by flames associated with ports 16 toward the center of burner 10 (i.e. internally within cavity 40). Further, by providing flames within cavity 40, such flames are generally laterally contained, which may prevent such flames from extending outwardly with respect to burner 10 and interfering with secondary air usage of adjacent ones of burner 10 (as shown in FIG. 2, for example). Such interaction between the flames of the respective burner units in other implementations can result in fluctuations in temperatures and fuel burning provided by such burners. The improved heat distribution, and concentration achieved by the inner flame burner 10, as described herein, can accordingly provide increased energy efficiency, including by reduction of heat loss laterally and around the associated cooking implement, which, in turn, can reduce fuel consumption by burner 10 and the associated appliance 12.

Figure 3:
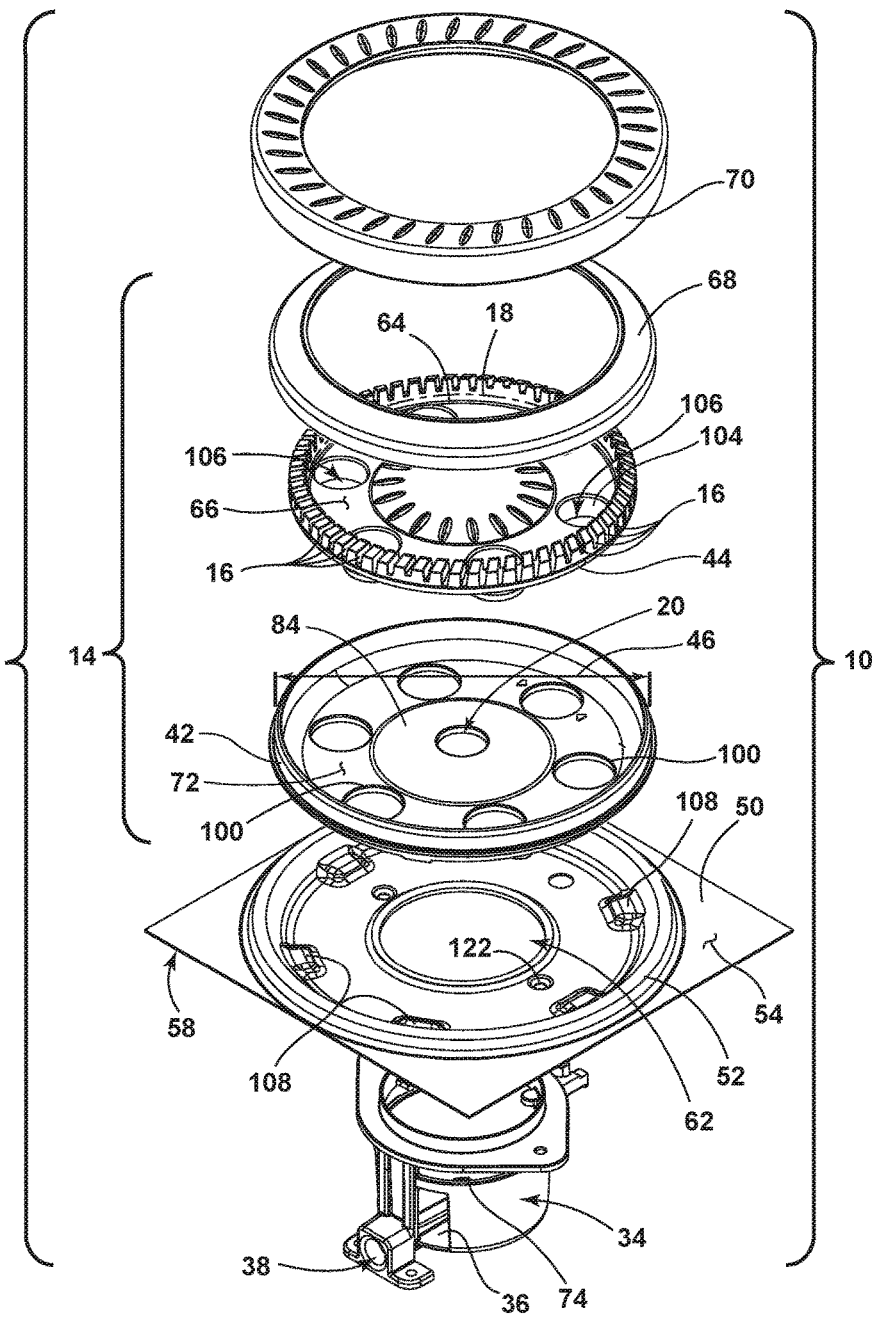
FIG. 3 is an exploded view of the burner assembly of FIG. 1.
Figure 4:
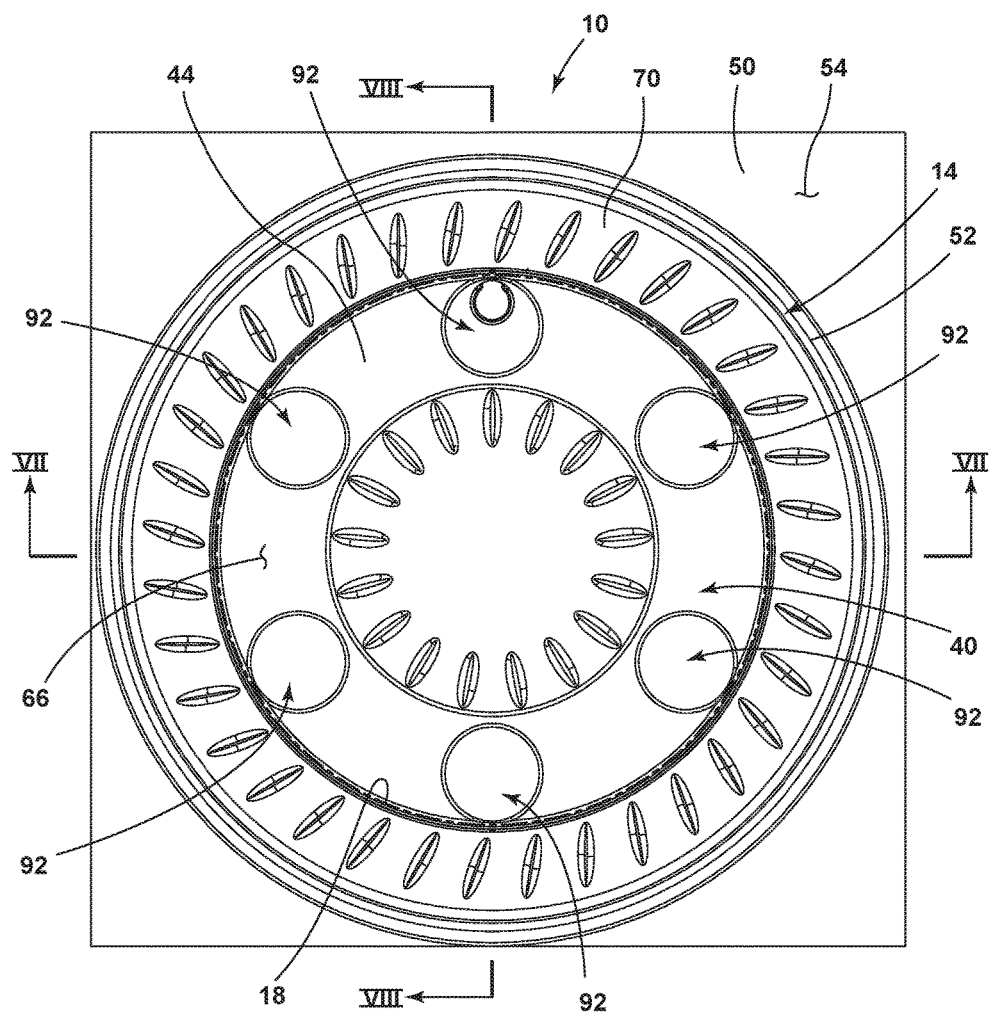
FIG. 4 is a top view of the burner assembly of FIG. 1.
Figure 5:
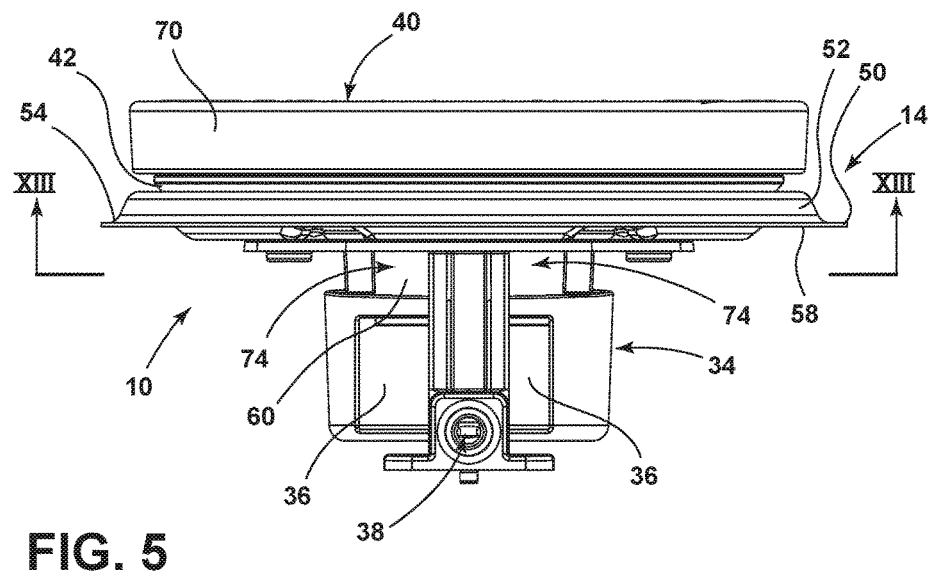
FIG. 5 is a front elevation view of the burner assembly of FIG. 1.
Figure 6:
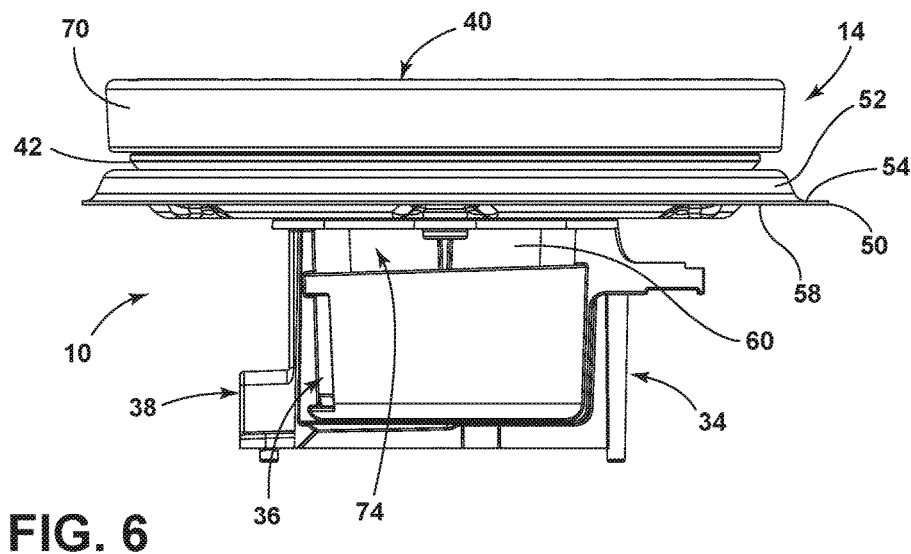
FIG. 6 is a right side elevation view of the burner assembly of FIG. 1.

As shown in FIG. 3, burner 10 can have a layered construction that is generally similar to other gas burner units, with appropriate modifications to provide the above-described inner flame configuration, as well as additional structures, as described below. In particular, burner 10 can be configured as a portion of a cooktop 50 defined on appliance 12, such as a range, as depicted in FIG. 2. In this manner, cooktop 50 can define a burner rim 52 therealong that is configured to receive base 42 therein by base 42 resting on the corresponding portion of top surface 54 of cooktop 50. As shown, burner 10 is positioned beneath grate 56 extending at least partially above burner 10, as depicted in FIG. 2. Holder unit 34 is coupled with cooktop 50 on a lower surface 58 thereof, so as to be opposite body 14 of burner 10 and to generally obscure the holder unit 34 itself, as well as the associated fuel supply lines and ignitor, which may themselves be positioned beneath the cooktop 50. The particular coupling of holder unit 34 with the lower surface 58 of cooktop 50 is described further below.

As further shown in FIGS. 5-8, a stem 60 extending from a remaining portion of base 42 is configured to extend through a corresponding opening 62 in cooktop 50 so as to be at least partially within holder unit 34. As described further below, venturi 24 is defined within stem 60 such that by positioning stem 60 within holder unit 34 the above-described second end 30 of venturi 24 is generally open to air and fuel provided through holder unit 34. In this manner, venturi 24 can mix the air and fuel provided by holder unit 34 and can provide such fuel air mix through mix inlet 20 to distribution chamber 22.

As further shown in FIG. 3, spreader 44 can rest within a corresponding portion of base 42 to define the above-described distribution chamber 22 therebetween. Further, spreader 44 can serve to visually obscure mix inlet 20 such that the interior of cooktop 50 can be generally hidden from view. As further illustrated in FIG. 3, an inner cap 68 can be assembled over corresponding portions of base 42 and spreader 44 to enclose an upper portion thereof and to generally direct the air fuel mix inwardly through ports 16. As further illustrated, inner cap 68 can define upper portions of the respective ports 16, such that the ports 16 can generally be defined by grooves extending generally outwardly from the cavity 40 and accordingly from interior side wall of spreader 64. A cover 70 can be positioned over inner cap 68 and can provide a finished appearance for body 14 of burner 10 and can shield the bases of flames associated with ports 16. In one example, base 42, spreader 44, and inner cap 68 can be fabricated from aluminum, including various alloys thereof, or other suitable heat-resistant materials. Further, cover 70 can for example be made of cast iron, steel, aluminum, or the like. In various aspects, cooktop can be fabricated from enameled steel, stainless steel, aluminum, or the like.

With continued reference to FIGS. 7 and 8, the above-described venturi 24 is discussed in greater detail. As mentioned above, venturi 24 is defined internally within stem 60 of base 42 and defines air-fuel mix inlet 20 at an intersection thereof upper surface 72 of base 42. In this manner, stem 60 can be configured to extend to a desired depth within holder unit 34 to open second end 32 of venturi 24 to the fuel provided by fuel inlet 38, which may be in the form of a jet, or the like and to, accordingly, incorporate air received into a holder unit 34 through air inlet 36, as well as secondary inlets 74. In this manner, venturi 24 can be configured to provide a desired mix of fuel, delivered in the form of natural or propane gas, for example, mixed with a desired amount of air to be burned by burner 10 after being delivered to cavity 40 by ports 16, as described above.

In a particular embodiment, second diameter 32 of venturi 24 can be greater than first diameter 28 by at least 50%. In a further aspect, venturi 24 can taper along the conical section 75 defined between first end 26 and second end 30 thereof, as depicted in FIGS. 7 and 8. Such a conical section 75 can taper gradually along a straight side wall of venturi 24 along length 76 between second end 30 and first end 26. In general, length 76 can be on the border of first diameter 28, i.e. within about 30% thereof. In one example, first diameter 28 can be about 18 mm, and second diameter 32 can be about 38 mm (all values +/−10%). In such an example, length 76 can be about 30 mm such that an angle 78 of conical section 75 can be about 72 degrees with respect to the horizontal, as depicted in FIG. 7.

As further illustrated in FIGS. 7 and 8, a cylindrical section 80 can be defined between conical section 75 and second end 30 of venturi 24. As illustrated, the cylindrical section 80 may be relatively short compared to the conical section 75. In one example, cylindrical section 80 can be between about 2 mm and 3 mm, and in a further example about 2.7 mm. As further illustrated, the transition between cylindrical section 80 and the surrounding surface 72 of base 42 can be relatively abrupt such that surface 72 extends immediately outwardly from an upper end of a cylindrical section 80 (generally defined by second end 30 of venturi 24, i.e. along a 90 degree or greater angle defining a corner, in cross-section). Alternatively, a small fillet 82 may be present between cylindrical section 80 and surface 72, a radius of such fillet 82 being less than about 1 mm, and in one example about 0.5 mm. Such a configuration, in combination with the configuration of conical section 75 may provide a desired fuel-air mixture for ports 16 in light of the configuration and orientation thereof. Further, the above-described configuration of venturi 24 may provide a sufficiently consistent mixture of fuel and air and may provide such a mixture to distribution chamber 22 at a velocity sufficient to force such mixture through distribution chamber 22 and through ports 16 at a desired rate.

In connection with the above-described geometry of venturi 24, distribution chamber 22 may be configured as shown in FIGS. 7 and 8 in which air fuel mix inlet 20 is provided along a convex portion 84 of surface 72 that is spaced apart from a facing concave portion 86 of the facing surface 88 of spreader 44. Further, the convex portion 84 of surface 72 and the concave portion 86 of surface 88 can be spaced apart at distance 90 configured to cooperate in connection with the above-described geometry of venturi 24 to provide the desired velocity and flow rate of the air fuel mixture to ports 16. In one aspect, convex portion 84 can be configured such that air fuel mix inlet 20 is positioned above the remaining outside portion of surface 72 by about 4.8 mm, and further such that convex portion 84 has a radius of about 67 mm (all values +/−10%). The corresponding geometry of concave portion 86 can be configured to match that of convex portion 84 while maintaining the desired gap 90 there between. In one example, gap 90 can be between about 3 mm and about 4 mm. In a further embodiment, gap 90 can be about 3.4 mm.

Figure 9:
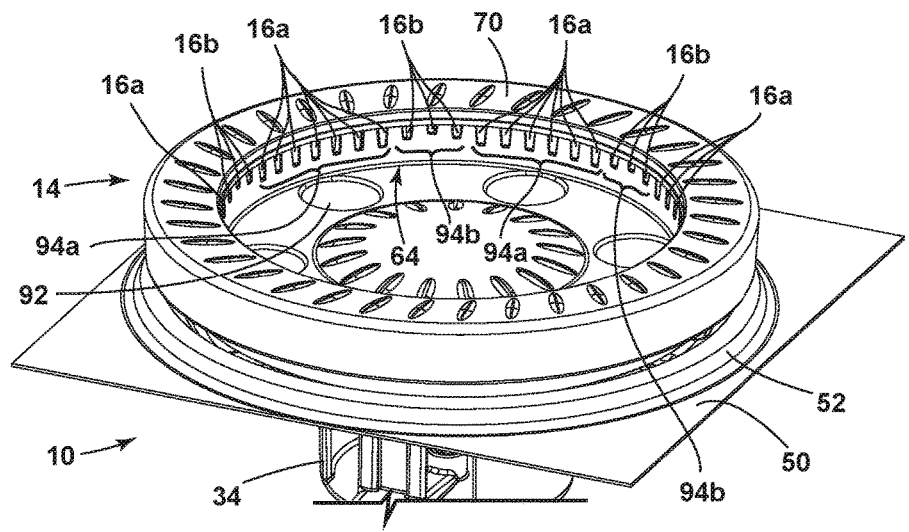
FIG. 9 is a further perspective view of the burner assembly of FIG. 1.
Figure 10:
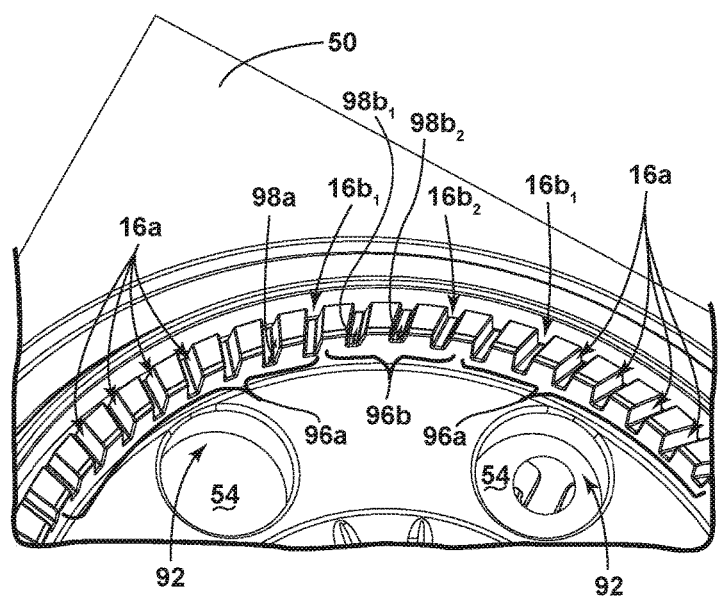
FIG. 10 is a detail view of the burner assembly of FIG. 1.

Turning now to FIGS. 9 and 10, a configuration of ports 16 is shown that can provide an improved characteristic for the flames provided by burner 10, as well as improved appearance thereof. As shown in FIGS. 8 and 10, and as further discussed below, body 14 can define a plurality of secondary air ports 92 that can provide a flow of secondary air to cavity 40 to be consumed during the burning of the flames provided by burner 10. In the illustrated embodiment, the ports 16 are defined collectively between base 42 and inner cap 68. As illustrated, such ports 92 can be arranged at regular intervals open on surface 66 of spreader 44 and extending vertically through body 14. The presence of secondary air ports 92 and the air provided thereby can cause alterations and irregularities in the shape of the flames provided by various ones of ports 16, including those positioned in between secondary air ports 92. Accordingly, to provide an even appearance and shape of the flames associated with such ones of ports 16, the ports 16 can be provided in first groups 94 of first ports 16a and second groups 96 of second ports 16b.

In general the second ports 16b can be defined as having an area that is reduced compared to the areas of the first ports 16a in the first groups 94. As illustrated, the first groups 94 and second groups 96 can be arranged in alternating fashion around perimeter 18 with second groups 96 positioned between and separating corresponding first groups 94. In such an arrangement, the second groups 96 can be positioned, as illustrated in FIG. 10, generally between secondary air ports 92 such that less fuel is provided thereto cavity 40 therethrough. The number of ports 16 distributed among first groups 94 and second groups 96 can vary, such as with the overall number of ports 16. In the illustrated embodiment, each of second groups 96 can include second ports 16b. In this manner, the first ports 16a distributed among the first groups 94 can comprise the majority of overall ports 16 with, in one example, spreader 44 defining 42 first ports 16a and 18 second ports, distributed among six groups each for a total of 60 overall ports 16.

As illustrated, the variations in area between first ports 16a and second ports 16b can be achieved by adjusting the overall heights of such ports 16a and 16b with ports 16a defining a greater height 98 than the respective heights 98b of the second ports 16b. In one example, the heights 98a of first ports 16a can be about 5 mm, while the heights 98 of second ports 16b can be about 3.5 mm or less. Further, as depicted in the example illustrated in FIGS. 9 and 10, the second ports 16b can include outer port $16b_1$ that have a first reduced area and a middle port $16b_2$ that has a second reduced area that is less than the first reduced area, which itself is, as discussed above, is less than the respective areas of first port 16a. Again, the reduction in area of the respective ports $16b_1$ and $16b_2$ can be achieved by middle port $16b_2$ having a height $98b_2$ that is less than the respective heights $98b_1$ of outer section ports $16b_1$. In one example the respective heights $98b_1$ of outer second ports $16b_1$ can be about 3.5 mm (defined by the distance at which port 16 extends below inner cap 68), while the height $98b_2$ of middle second port $16b_2$ can be about 2.4 mm. Accordingly, the reduction in overall areas of the respective ports 16 can vary with the change in heights thereof. By providing reduced fuel through ports 16b in this manner, a uniform flame appearance and shape and accordingly even heat distribution among ports 16a and 16b can be achieved.

Figure 11:
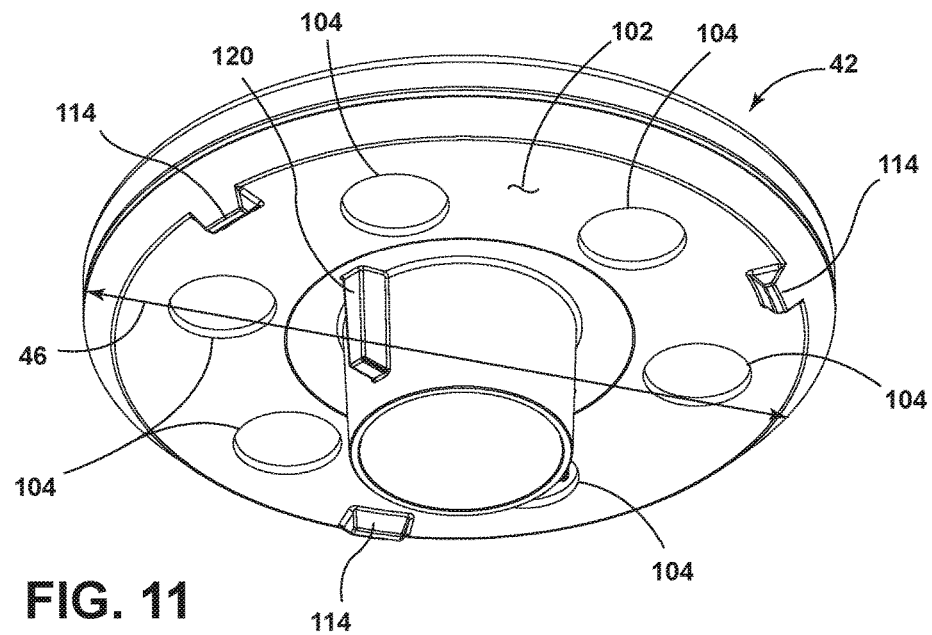
FIG. 11 is lower-perspective view of a base component of the burner assembly of FIG. 1.
Figure 12:
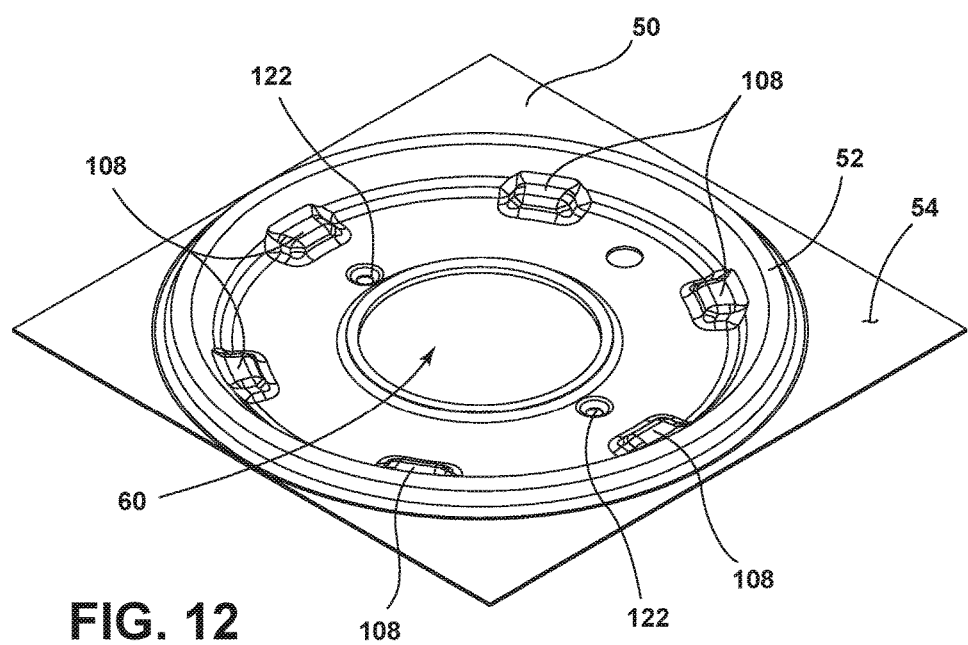
FIG. 12 is a top-perspective view of a cooktop configured to support the base of FIG. 11.

As shown in FIGS. 11 and 12, with further reference to FIG. 8, and as discussed above, body 14 can define secondary air ports 92 therethrough that can be configured to provide a secondary flow of air to cavity 40 for consumption by the flames associated with ports 16. As shown in FIG. 11, base 42 can provide a plurality of port holes 100 therethrough that are open between surface 72 as well as lower surface 102 of base 42. As further shown in FIG. 8, spreader 44 can define a plurality of port bases 104 extending from surface 88 toward and into contact with base 42 and aligned with port holes 100. A corresponding plurality of holes 106 can extend through port bases 104 such that secondary air ports 92 are provided through the entirety of body 14 and are isolated from distribution chamber 22. Further, port bases 104 can define a plurality of support platforms 108 that engage with surface 72 to provide the above-described spacing of spreader 44 above base 42 to provide the above-described gap 90.

As shown in FIGS. 7 and 8, the presence of port bases 104 and distribution chamber 22 can provide a disruption of the fuel air mix path 48 through distribution chamber 22. In this manner, and as described above, the reduction in the area of ports 16b can help balance the interruptions associated with such internal features within distribution chamber 22 as described above, the groups 94b of second ports 16b, being radially aligned with the secondary air ports 92.

As shown in FIG. 12, cooktop 50 can be generally solid in the area of secondary air ports 92, such that the interior of cooktop 50 cannot be visualized through secondary air ports 92. Such a configuration further helps to prevent spillage of various substances through cooktop 50 in the area of secondary airports 92. To provide a desired flow of air through secondary air port 92, given such a configuration, cooktop 50 is configured to space apart lower surface 102 of base 42 and upper surface 54 of cooktop 50. As illustrated, such configuration can include the incorporation of support platforms 108 within cooktop 50 toward an interior of burner rim 52 and around a circumference thereof. As illustrated in FIGS. 7 and 8, base 42 can rest on support platforms 108, with the area therebetween providing access to a gap 112 thusly defined surface 54 and surface 102. Gap 112 can provide a direct secondary air flow path 110 within gap 112 and through secondary air ports 92 to cavity 40. Additionally, as shown in FIG. 11, a plurality of feet 114 can be integral with and extend downwardly from base 42 to further provide support for surface 102 above surface 54, resulting in the presence of gap 112.

Figure 13:
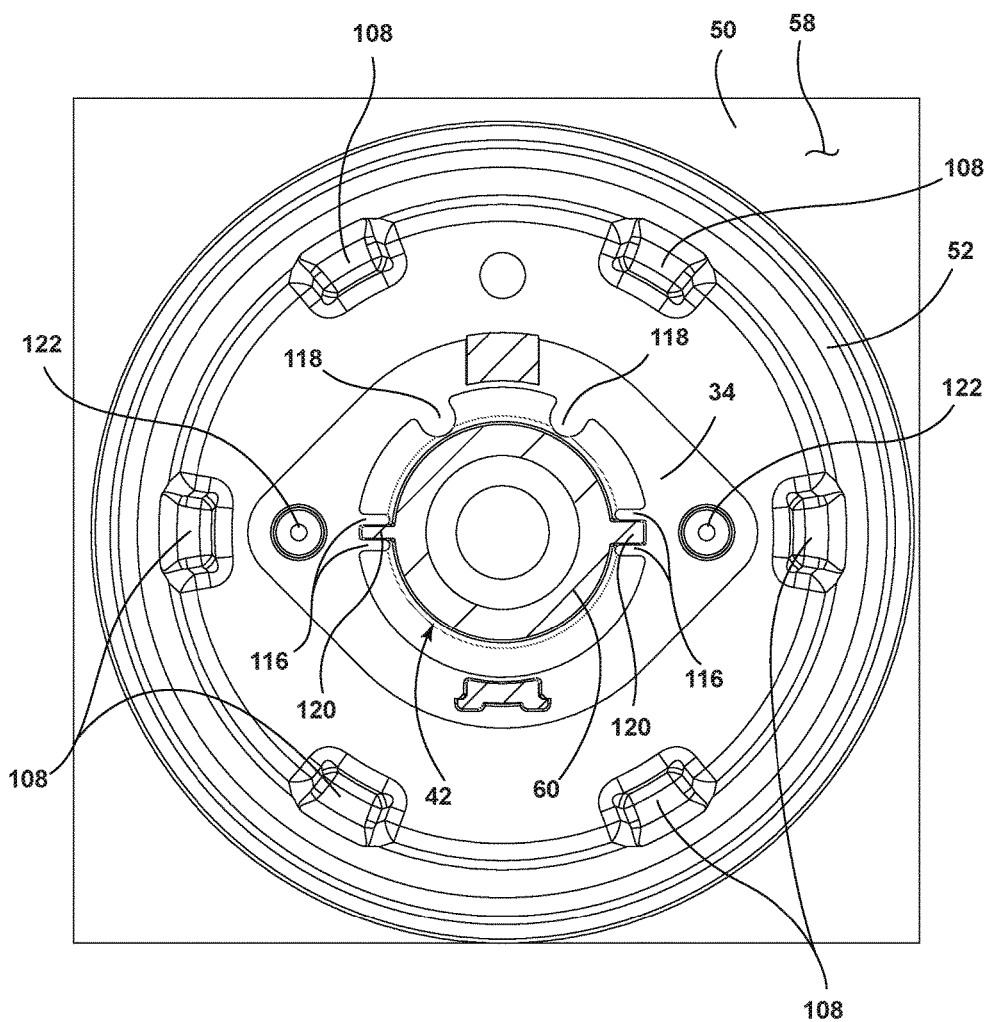
FIG. 13 is a cross-section view taken along the line XIII-XIII in FIG. 5.

Turning now to FIG. 13, holder unit 34 can be coupled on the lower surface 58 of cooktop 50 using a specific arrangement of alignment features, including a plurality of poka-yoke rabbets 116 that engage with a corresponding plurality of poka-yoke flanges 118 incorporated with holder unit 34. Further, a set of interengaging features, including horizontal flanges 120 can extend from base 42 adjacent stem 60. As shown in FIG. 13 the rabbets 116 can have spacing that corresponds to a particular one of the flanges 120 such that holder unit 34, when coupled with cooktop 50 using fasteners engaged with holes 122 will only accept base 42, including stem 60 therein in a particular alignment. Further, flanges 118 are configured to contact stem 60 to maintain a particular axial alignment of holder unit 34 with stem 60. In this manner a desired alignment of base 42 and, accordingly, body 14 can be achieved with respect to holder unit 34, which can help provide the desired fuel-air mixture into venturi 24 and can, further, position additional components, including an ignitor at a desired location with respect to, for example, ports 16.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A gas burner for a cooking appliance, comprising:
   a body defining a perimeter and including:
      a plurality of first groups of respective pluralities of first outlets; and
      a plurality of second groups of respective pluralities of second outlets;
   wherein:
      each of the first outlets respectively defines a first outlet area;
      each of the second outlets defines respective reduced outlet areas that are less than the first outlet area;
      the first groups and second groups are alternately arranged around the perimeter;
      a total number of first outlets is greater than a total number of second outlets;
      the second groups each include three adjacent ones of the second outlets; and
      a first one of the reduced outlet areas defined by a middle one of the three adjacent ones of the second outlets is a first reduced outlet area, the remaining two of the three adjacent ones of the second outlets define respective second reduced outlet areas that are greater than the first reduced outlet area.

2. The gas burner of claim 1, wherein the burner includes six first groups and six second groups.

3. The gas burner of claim 1, wherein:
   the body defines a fuel-air mix inlet in communication with the plurality of outlets through a distribution chamber within the body;
   a plurality of internal features disrupt portions of the distribution chamber at regular intervals; and
   the second outlet groups radially align with respective ones of the internal features.

4. The gas burner of claim 3, wherein the internal features of the body include port bases defining secondary air ports extending vertically through the body of the burner.

5. The gas burner of claim 1, wherein:
   the body includes a base defining an outer diameter of the body and a spreader received within a portion of the body and defining a recessed cavity inset relative to the outer diameter of the body;

a fuel-air mix distribution chamber in communication with the first outlets and the second outlets is defined at a lower end by a portion of the base and at an upper end by the spreader; and the perimeter of the body is an inner perimeter around recessed cavity such that the plurality of outlets are defined through the spreader to extend inwardly from the distribution chamber to the recessed cavity.

6. A gas burner assembly for a cooking appliance, comprising:

a body defining:
  a perimeter;
  a plurality of first groups of respective pluralities of first outlets; and
  a plurality of second groups of respective pluralities of second outlets;
  an air-fuel mix inlet;
  a distribution chamber in fluid communication between the air-fuel mix inlet and the plurality of outlets; and
  a venturi in communication with the air-fuel mix inlet at a first end thereof, the first end of the venturi having a first diameter, and the venturi extending to a second end opposite the first end and having a second diameter greater than the first diameter; and a holder unit defining an air inlet and a fuel inlet, both the air inlet and the fuel inlet being in fluid communication with the venturi at the second end thereof;

wherein:
  each of the first outlets respectively defines a first outlet area;
  each of the second outlets defines respective reduced outlet areas that are less than the first outlet area;
  the first groups and second groups are alternately arranged around the perimeter;
  a total number of first outlets is greater than a total number of second outlets;
  the second groups each include three adjacent ones of the second outlets; and
  a first one of the reduced outlet areas defined by a middle one of the three adjacent ones of the second outlets is a first reduced outlet area, the remaining two of the three adjacent ones of the second outlets define respective second reduced outlet areas that are greater than the first reduced outlet area.

7. The gas burner assembly of claim 6, wherein the second diameter is greater than the first diameter by at least 50%.

8. The gas burner assembly of claim 6, wherein the venturi tapers along a conical section between the first diameter and the second diameter.

9. The gas burner assembly of claim 6, wherein the venturi communicates with the distribution chamber at the air-fuel mix inlet, the air-fuel mix inlet defining one of a 90 degree corner or a fillet having a radius of less than 2 mm.

10. The gas burner assembly of claim 9, wherein the air-fuel mix inlet is open on a lower surface of the distribution chamber along a convex portion thereof.

11. The gas burner assembly of claim 6, wherein the body includes a base and a spreader, the base defining the air-fuel mix inlet and the spreader defining the plurality of outlets around an inner perimeter thereof, the distribution chamber defined between the base and the spreader.

12. The gas burner assembly of claim 11, wherein the base defines a convex portion surrounding the air-fuel mix inlet at which the venturi communicates with the distribution chamber, the spreader defining a concave portion facing and aligned with the convex portion of the base.

13. The gas burner assembly of claim 11, wherein the base and the spreader collectively define a plurality of secondary air ports through the body from a lower side thereof to an interior defined by the inner perimeter of the spreader.

14. A cooking hob, comprising:

a cooktop body defining a first burner area along the upper surface;

a burner having a body positioned within the first burner area and including:
  a plurality of first groups of respective pluralities of first outlets; and
  a plurality of second groups of respective pluralities of second outlets;

wherein:
  each of the first outlets respectively defines a first outlet area;
  each of the second outlets defines respective reduced outlet areas that are less than the first outlet area;
  the first groups and second groups are alternately arranged around the perimeter;
  a total number of first outlets is greater than a total number of second outlets;
  the second groups each include three adjacent ones of the second outlets; and
  a first one of the reduced outlet areas defined by a middle one of the three adjacent ones of the second outlets is a first reduced outlet area, the remaining two of the three adjacent ones of the second outlets define respective second reduced outlet areas that are greater than the first reduced outlet area.

15. The cooking hob of claim 14, wherein:

the cooktop body further defines an upper surface and a lower surface;

the body further defines a lower surface, an upper surface, and a plurality of ports extending between the upper and lower surfaces;

the lower surface of the burner is spaced above the upper surface of the cooktop body to define an air flow path from an outer periphery of the burner, along the lower surface thereof, and through the plurality of ports; and the cooktop body further defines a plurality of support platforms around a circumference of the burner area, the body resting on the support platforms such that the lower surface of the body of the burner is spaced above the upper surface of the cooktop body.

16. The cooking hob of claim 14, wherein the body further defines:

an interior side wall surrounding and facing the upper surface of the body; and the plurality of outlets extend between the interior side wall and a distribution chamber within the burner body.

17. The cooking hob of claim 16, wherein:

the body further defines:
  a distribution chamber in fluid communication between an air-fuel mix inlet and the plurality of outlets; and
  a venturi in communication with the distribution chamber at the air-fuel mix inlet thereof, the first end of the venturi having a first diameter, and the venturi extending to a second end opposite the first end and having a second diameter greater than the first diameter; and the cooking hob further includes a holder unit coupled with the lower surface of the cooktop body at an interface therebetween including a poka-yoke alignment arrangement, the holder unit further defining an air inlet and a fuel inlet, both the air inlet and the fuel inlet being in fluid communication with the venturi at a second end thereof.

\* \* \* \* \*